United States Patent
Chang et al.

(10) Patent No.: US 8,274,597 B2
(45) Date of Patent: Sep. 25, 2012

(54) SYSTEM AND METHOD FOR MEASURING A BORDER OF AN IMAGE OF AN OBJECT

(75) Inventors: Chih-Kuang Chang, Taipei Hsien (TW); Xian-Yi Chen, Shenzhen (CN); Yan-Li Li, Shenzhen (CN); Yi-Rong Hong, Shenzhen (CN); Li Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 624 days.

(21) Appl. No.: 12/430,782

(22) Filed: Apr. 27, 2009

(65) Prior Publication Data

US 2010/0073550 A1    Mar. 25, 2010

(30) Foreign Application Priority Data

Sep. 25, 2008   (CN) .......................... 2008 1 0304669

(51) Int. Cl.
*H04N 5/232*   (2006.01)
(52) U.S. Cl. ....................................... 348/349
(58) Field of Classification Search ................... 348/349
See application file for complete search history.

(56) References Cited

U.S. PATENT DOCUMENTS

| | | | | |
|---|---|---|---|---|
| 5,608,816 | A * | 3/1997 | Kawahara et al. | 382/149 |
| 7,747,080 | B2 * | 6/2010 | Chang et al. | 382/199 |
| 8,073,246 | B2 * | 12/2011 | Adams et al. | 382/162 |
| 2002/0044691 | A1 * | 4/2002 | Matsugu | 382/218 |
| 2009/0161940 | A1 * | 6/2009 | Chang et al. | 382/141 |

FOREIGN PATENT DOCUMENTS

CN   200610062038.7   2/2008

* cited by examiner

*Primary Examiner* — Clayton E Laballe
*Assistant Examiner* — Linda B Smith
(74) *Attorney, Agent, or Firm* — Altis Law Group, Inc.

(57) ABSTRACT

A system and method for measuring a border of an image of an object includes setting measurement parameters, selecting a start point, an end point, and a image capture direction, and marking isS=true, moving a CCD lens to a current point, capturing an image by the CCD lens, and obtaining sequential border points of the image. The method further includes determining if the sequential border points are fuzzy, performing an automatic focus function if the sequential border points are fuzzy, or further determining the border of the object has been completely captured if the sequential border points are clear, calculating accurate border points if the border of the object has not been completely captured, and determining a new start point to capture the next image of the object.

10 Claims, 8 Drawing Sheets

Grads calculation:
Along a direction of an arrow,
Grade2=Gray3-Gray1
Grade3=Gray4-Gray2
Grade4=Gray5-Gray3
Grade5=Gray6-Gray4
"Grade" stands for grads
"Gray" stands for gray scale

FIG. 5

SYSTEM AND METHOD FOR MEASURING A BORDER OF AN IMAGE OF AN OBJECT

BACKGROUND

1. Technical Field

Embodiments of the present disclosure relate to systems and methods for measuring images, and particularly to a system and method for measuring a border of an image of an object.

2. Description of Related Art

Measurement is an important phase in the manufacturing process and is closely interrelated to product quality. Generally, an engineer will use an image measuring machine to obtain an electronic image of an object. The image is stored in a computer and may be shown on a display device, where a program is used to determine precision of the object according to pixel data in the image.

One way of measuring a border of an image utilizes a method to automatically measure an edge of a workpiece. However, the present method needs to focus on the workpiece each time before measuring, and performing a binary image processing on the entire image captured by a charge coupled device (CCD) lens of the image measuring machine. Therefore, measuring speed is slow because a large number of calculations are performed due to the binary image processing of the entire image.

BRIEF DESCRIPTION OF THE DRAWINGS

FIG. 5 is a schematic diagram of one embodiment of a method for calculating a value of the grads;

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
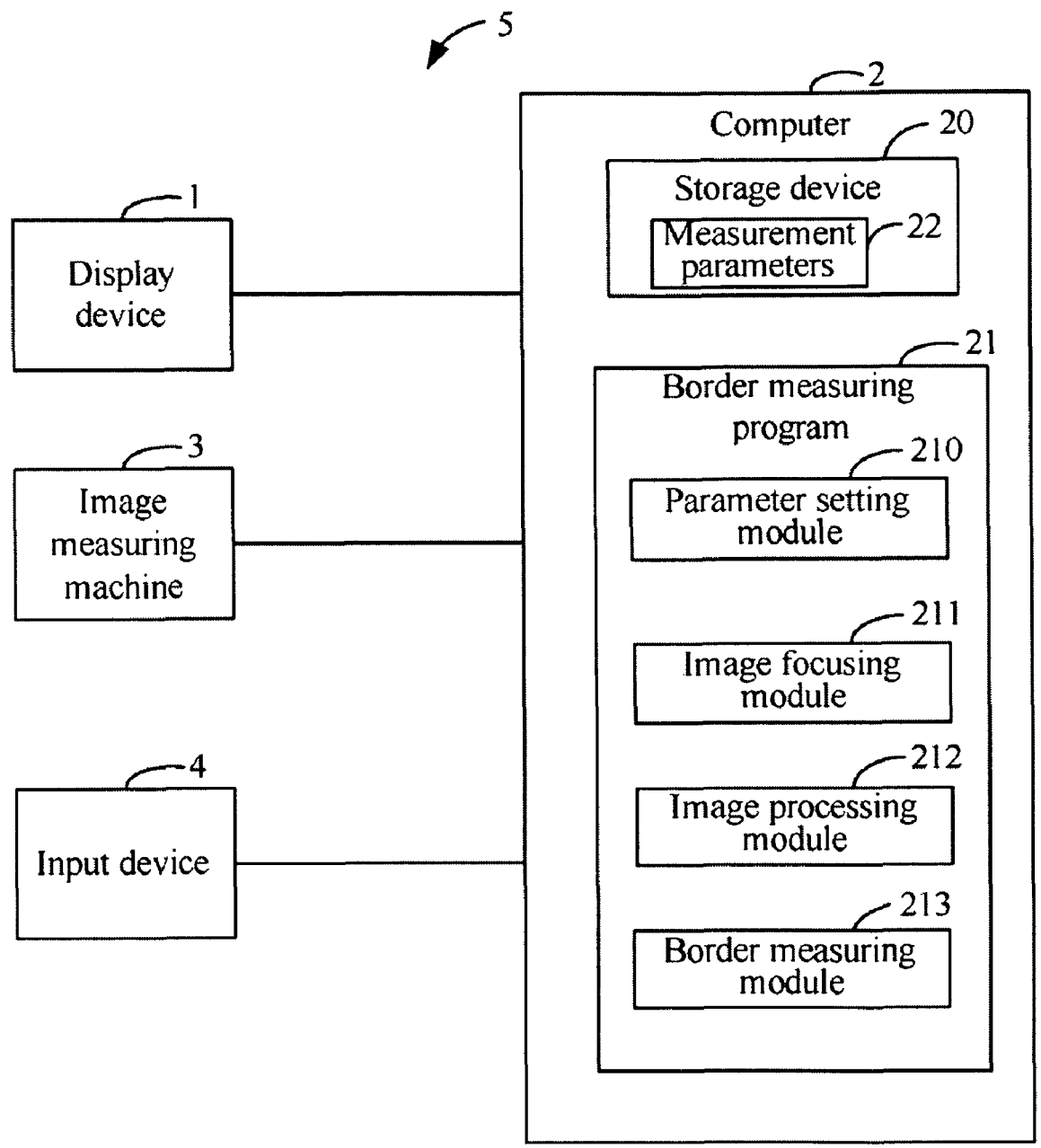
FIG. 1 is a block diagram of one embodiment of a system for measuring a border of an image of an object.

FIG. 1 is a block diagram of one embodiment of a system 5 for measuring a border of an image of an object. In one embodiment, the system 5 includes a display device 1, an image measuring machine 3, and an input device 4 electronically connected to a computer 2. Depending on the embodiment, the display device 1 may be a computer display, a monitor, or a television, for example.

Figure 2:
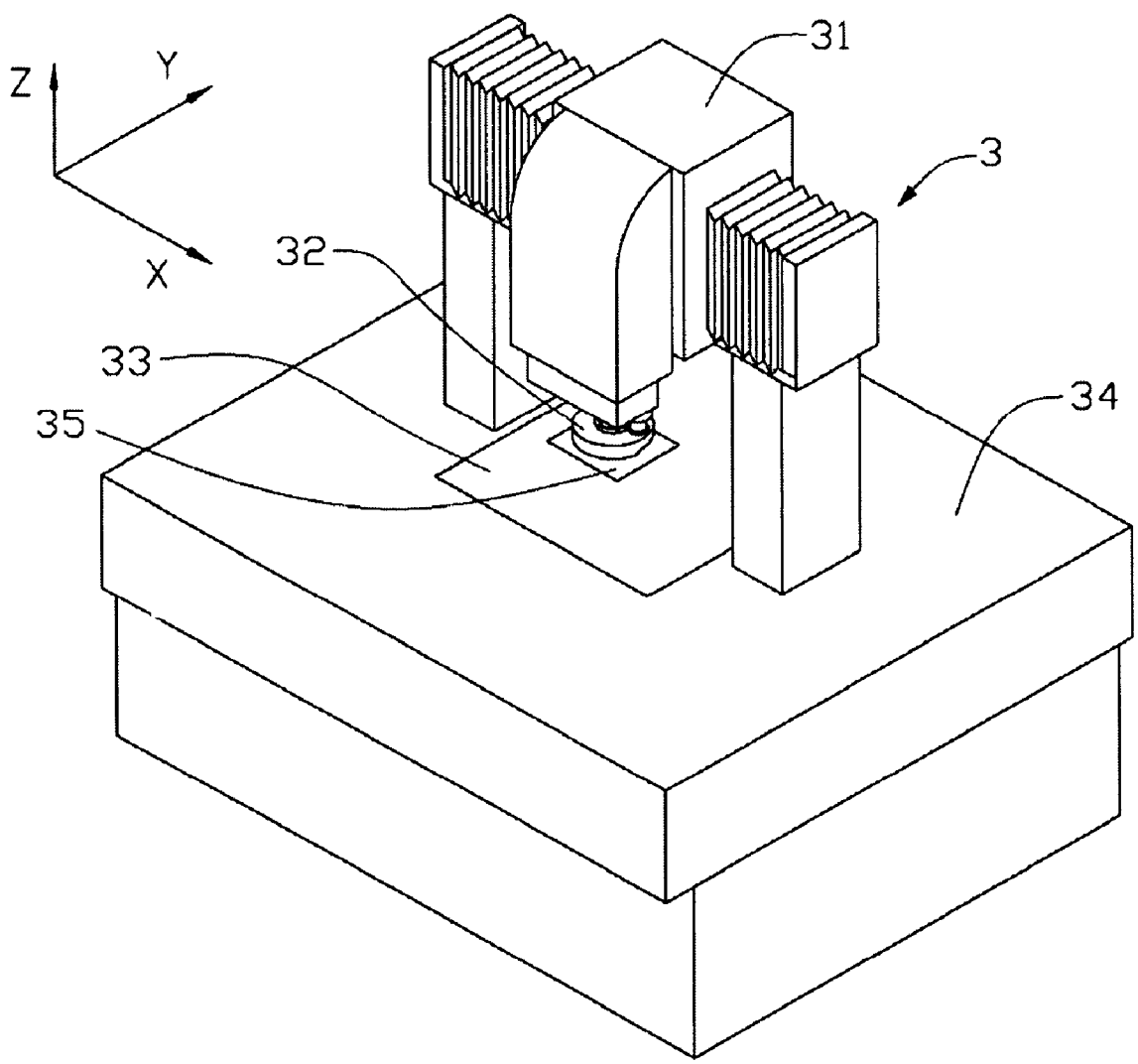
FIG. 2 is a schematic diagram of a model of one embodiment of an image measuring machine.

A schematic diagram of one embodiment of the image measuring machine 3 is shown in FIG. 2. The image measuring machine 3 includes parts of a top cover 31, a CCD lens 32, a workplace 33, and a holder 34. An object 35 to be measured is located on the workplace 33. It may be understood that the embodiment of the image measuring machine 3 as illustrated in FIG. 2 is exemplary and may include other components that will be explained further herein, such as an X-axis motor along the X-axis, a Y-axis motor along the Y-axis, and an Z-axis motor along the Z-axis.

The CCD lens 32 is connected to an image adapter card of the computer 2, and includes a focusing function which has a fixed capture spectrum. The CCD lens 32 is used to capture images of the object 35 by utilizing the focusing function. If the fixed capture spectrum is less than a size of the object 35, the workplace 33 needs to be moved by the X-axis motor and the Y-axis motor that are driven by a motion control adapter card of the computer 2, so that the CCD lens 32 can capture other parts of the object 35 horizontally. The Z-axis motor is used to control the CCD lens 32 to move in a vertical direction. For example, the Z-axis motor controls placement of the CCD lens 32 to focus on the object 35.

The computer 2 includes a storage device 20 and a border measuring program 21. The storage device 20 can store many kinds of information, such as measurement parameters 22. In one embodiment, the measurement parameters 22 includes a length of a measurement line and a sampling interval of the object 35 to determine accurate border points of the object 35.

The border measuring program 21 measures a border of an image of the object 35. The image measuring machine 3 captures images of the object 35 via the CCD lens 32, and sends the images to the computer 2.

The input device 4 is provided for manually moving one or more parts of the image measuring machine 3, e.g., moving along the X-axis, moving along the Y-axis, or moving along the Z-axis (refer to X-Y-Z coordinates shown in FIG. 2). The input device 4 may be a jack with handle for manually adjusting position of image measuring machine 3, although the disclosure is not limited thereto.

In one embodiment, the border measuring program 21 includes a parameter setting module 210, an image focusing module 211, an image processing module 212, and a border measuring module 213. In one embodiment, the modules 210-213 may comprise computerized instructions that are stored in the storage device 20. A processor of the computer 2 may execute the computerized instructions to implement one or more operations of the computer 2.

The parameter setting module 210 sets the measurement parameters of the object 35. As mentioned above, the measurement parameters include the length of the measurement line and the sampling interval of the object 35 to determine accurate border points of the object 35. For example, a length of the measurement line may be less than 80 pixels and greater than 0 pixels.

The image focusing module 211 selects a start point "Ps", an end point "Pe," and an image capture direction to capture an image of a border of the object 35, assigning a variable "isS" with a value of "true" (isS=true) if an image of the object 35 is the first captured image, and setting the start point "Ps" as an initial position of a current point "Pc"(Pc=Ps). The variable "isS" is used to determine if an image is the first captured image, and may be a Boolean variable, in one example. In one embodiment, the image focusing module 211 marks isS=true if an image of the object 35 is the first captured image. Otherwise, the image focusing module 211 marks isS=false if an image of the object 35 is not the first captured image.

The image focusing module 211 moves the CCD lens 32 of the image measuring machine 3 to the current point "Pc."

The image processing module 212 performs binary image processing on the border of the image captured by the CCD lens 32 to obtain a binary image, and obtains sequential border points in the binary image. It may be understood that the binary image has only two possible values for each pixel in the binary image. Usually, two colors used for the binary image are black and white, although any two colors can be used. In one embodiment, the color used for the object 35 in the image is the foreground color (such as black), while the rest of the image is the background color (such as white). In one embodiment, the image processing module 212 only performs the binary image processing on the border of the captured image so as to decrease the number of calculations of the binary processing.

A detailed description of obtaining sequential border points in the binary image by the image processing module 212 is as follows. If the current point "Pc" is a border point in the binary image, the image processing module 212 obtains border points adjacent to the current point "Pc," and searches for other border points using a recursive method. If the current point "Pc" is not a border point in the binary image, the image processing module 212 obtains border points nearest to the current point "Pc" sequentially in a clockwise direction or in a counterclockwise direction, and searches for other border points using the recursive method.

The image focusing module 211 determines if the sequential border points in the binary image are fuzzy, and performs an automatic focus function on the border of the object 35 if the sequential border points are fuzzy. To determine if the sequential border points are fuzzy, the image focusing module 211 samples a preset quantity of border points from the sequential border points, calculates an average value of grads of the sampled border points, and determines the sequential border points are fuzzy if the average value of grads is less than a preset value.

Figure 8:
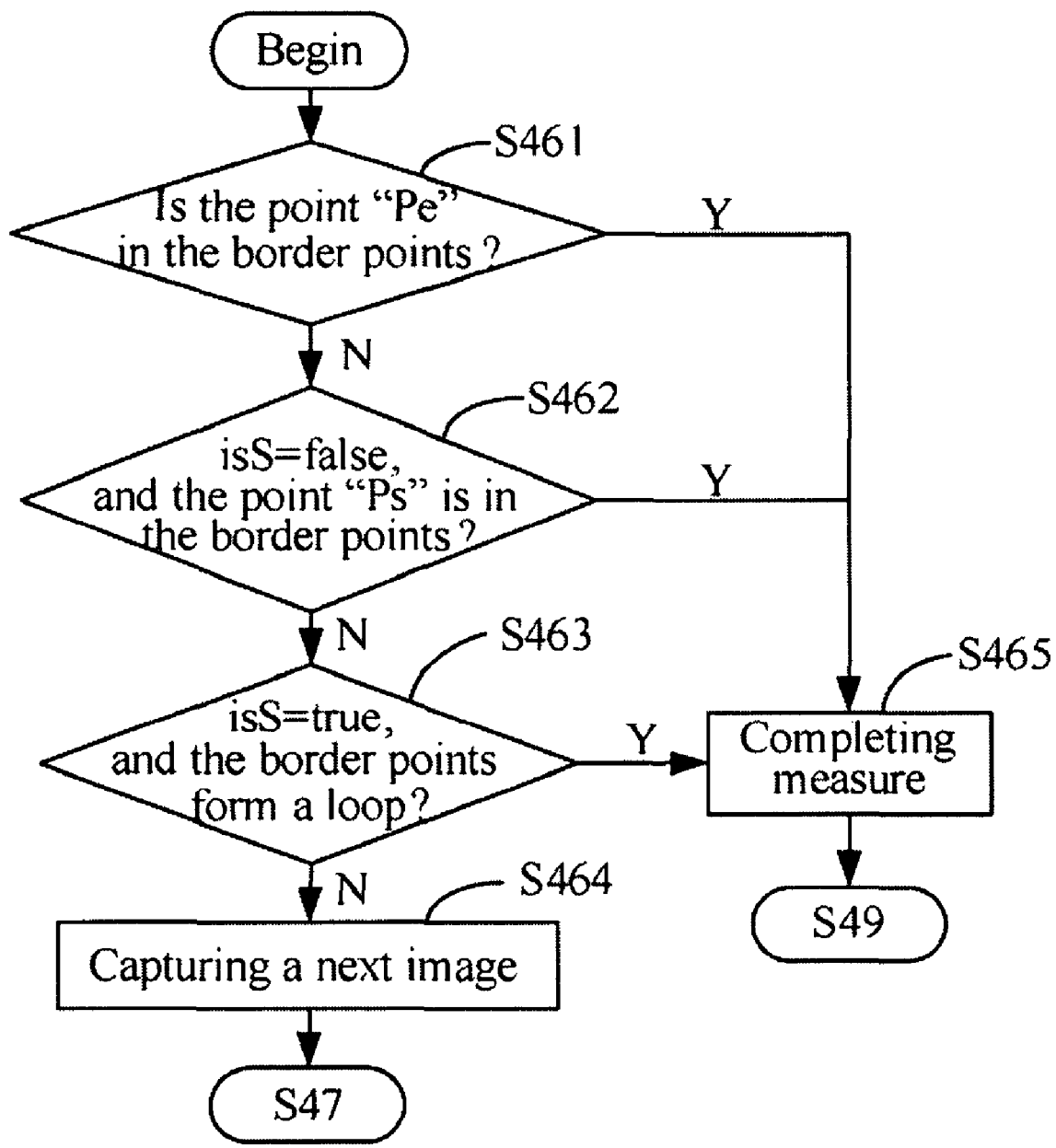
FIG. 8 is a detailed description of step S46 in FIG. 7.

The border measuring module 213 determines if the border of the object 35 has been completely captured once the sequential border points are clear (i.e., the average value of grads of the sampled border points is greater than or equal to a preset value), and displays success information if the border of the object has been captured completely. For example, the success information is displayed on the display device 1 with a program dialog box. A detailed description of determining if the border of the object 35 has been completely captured is shown in FIG. 8 as below.

The border measuring module 213 calculates accurate border points according to the length of the measurement line and the sampling interval if the border of the object 35 has not been completely captured. To calculate accurate border points, the border measuring module 213 samples a quantity of border points from the sequential border points according to the sampling interval, calculates a normal vector of each of the sampled border points, obtains a start point and an end point of the measurement line according to the normal vector and the length of the measurement line, calculates a gradient chart from the start point to the end point of the measurement line, and obtains a top point of each of the gradient charts, which are taken as accurate border points.

Figure 3:
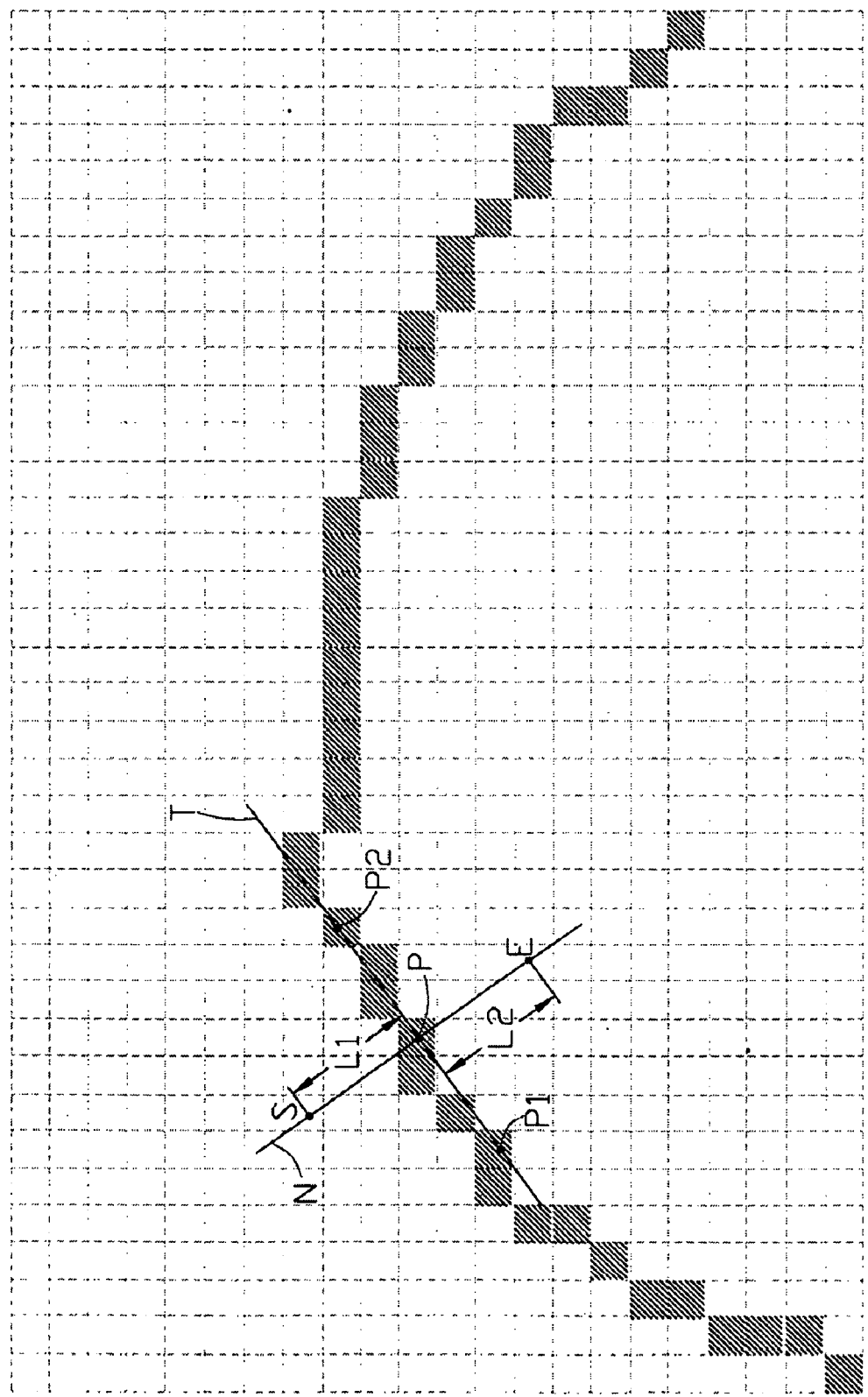
FIG. 3 is a schematic diagram of one embodiment of a method for calculating a start point and an end point of a measurement line.

A detailed description of obtaining the start point and the end point of the measurement line is shown in FIG. 3. If the point "P" in FIG. 3 represents a current point of the object 35, the normal vector of the point "P" is obtained from a tangent vector of the point "P." For example, if the tangent vector of the point "P" is $\{i,j\}$, the normal vector is $\{-j,i\}$. The tangent vector of the point "P" can be obtained, using the least square method, from the point "P" and other points adjacent to the point "P" (hereinafter, "a first method"), or obtained by fitting a straight line with points adjacent to the point "P" (hereinafter, "a second method"). The second method is described in FIG. 3. In FIG. 3, the point "P1" is the third point before the point "P," the point "P2" is the third point after the point "P", the straight line "T" having the points "P1" and "P2" is regarded as the tangent vector of the point "P". The normal vector of the point "P" is "N", and "N" is perpendicular to the tangent vector "T". The start point "S" and the end point "E" of the measurement line are located on the normal vector "N" of the point "P". Equations for calculating coordinates of the start point "S" and the end point "E" of the measurement line are as follows.

$Sx=Px-(-j)*L1, Sy=Py-i*L1$ $Ex=Px+(-j)*L2, Ey=Py+i*L2$

In the above-mentioned equations, "Px" represents an X-axis coordinate of the point "P", "Py" represents a Y-axis coordinate of the point "P", "Sx" represents an X-axis coordinate of the start point "S" of the measurement line, "Sy" represents a Y-axis coordinate of the start point "S" of the measurement line, "Ex" represents an X-axis coordinate of the end point "E" of the measurement line, and "Ey" represents a Y-axis coordinate of the end point "E" of the measurement line. "L1"+"L2" is equal to the length of the measurement line. In FIG. 3, the length of "L1" is equal to the length of "L2" (L1=L2).

Figure 4:
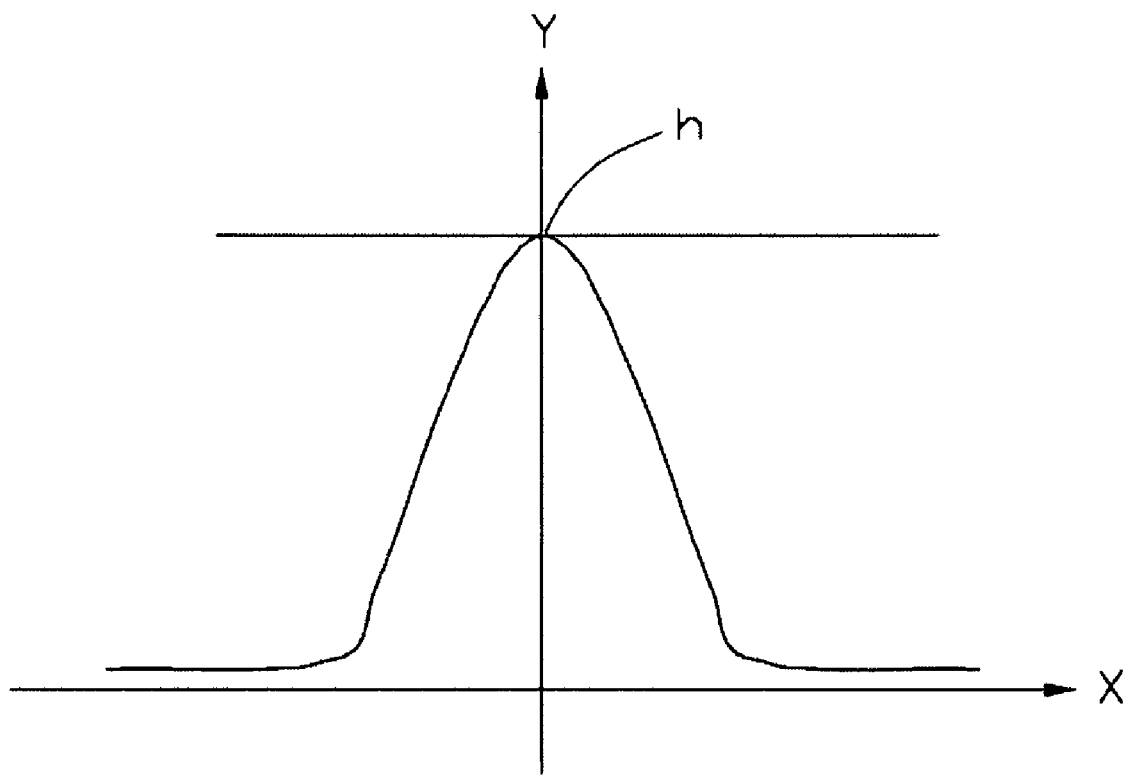
FIG. 4 is a schematic diagram of one embodiment of a gradient chart from the start point to the end point of the measurement line.

When the start point "S" and the end point "E" are calculated, the border measuring module 213 further calculates a gradient chart from the start point "S" to the end point "E" of the measurement line, and obtains a top point of each of the gradient charts, which are taken as accurate border points. An example of the gradient chart is shown in FIG. 4, the top point "h" in FIG. 4 is regarded as an accurate border point. A method for calculating the grads is shown in FIG. 5.

Figure 6:
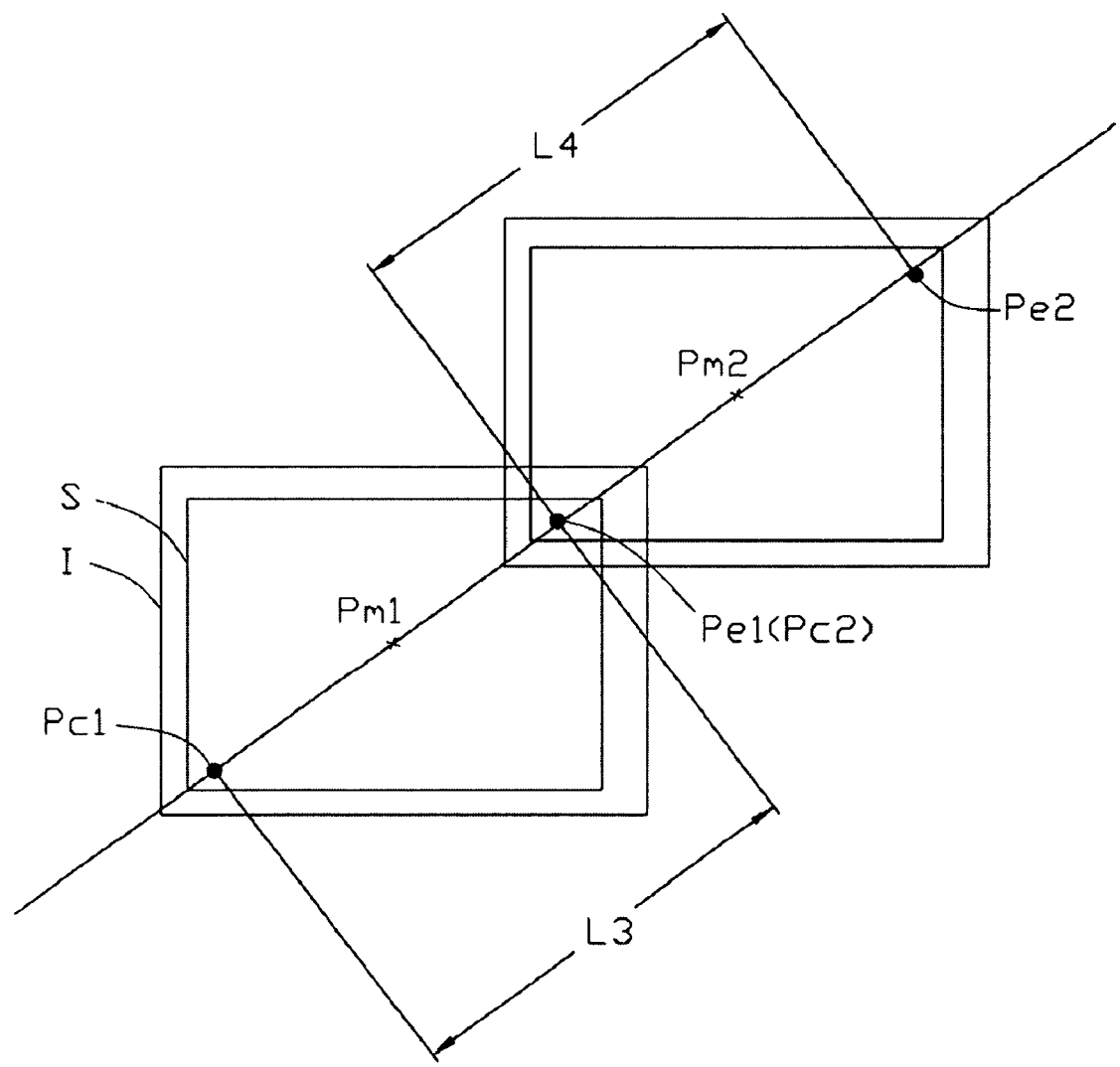
FIG. 6 is a schematic diagram of one embodiment of a method for determining a new start point and a corresponding position of a CCD lens.

The border measuring module 213 selects a last point from the accurate border points obtained thus far, as a new start point to capture a next image of the object 35, determining a corresponding position of the CCD lens 32 according to the new start point, marking isS=false if an image of the object 35 is not the first captured image, and setting the new start point as the current point (Pc=the new start point), then capturing the next image of the object 35 for measuring. To determine the position of the CCD lens 32, a center point of a capture area of the CCD lens 32 being located on a tangent of the new start point, the new start point falling in a measurement area of the capture area. The measurement area is a sub-area of the capture area of the CCD lens 32. An example of determining a new start point and a corresponding position of the CCD lens 32 is shown in FIG. 6. In FIG. 6, "I" represents a capture area of the CCD lens 32, "S" represents a measurement area of the capture area "I", "Pc1" represents a current point, "Pm1" represents a current position of the CCD lens 32, "Pe1" (or "Pc2") represents a last point of the accurate border points of the current measure and a start point of a next measure, "Pm2" represents a position of the CCD lens 32 of a next measure, "Pe2" represents a last point of the accurate border points of the next measure.

FIG. 2 is a flowchart of one embodiment of a method for measuring a border of an image of an object.

In block S40, the parameter setting module 210 sets measurement parameters of the object 35, the measurement parameters including the length of the measurement line and the sampling interval of the object 35 to determine accurate border points of the object.

In block S41, the image focusing module 211 selects a start point "Ps", an end point "Pe," and an image capture direction of the object 35 to capture an image of a border of the object 35, assigns a variable "isS" with a value of "true" (isS=true) if an image of the object 35 is the first captured image, and sets the start point "Ps" as an initial position of a current point "Pc" (Pc=Ps) of the object 35. The variable "isS" is used to determine if an image is the first captured image. In one embodiment, the image focusing module 211 marks isS=true if an image of the object 35 is the first captured image Otherwise, the image focusing module 211 marks isS=false if an image of the object 35 is not the first captured image.

In block S42, the image focusing module 211 moves the CCD lens 32 of an image measuring machine 3 to the current point "Pc".

In block S43, the image processing module 212 captures the image of the object 35, performing binary image processing on the border of the image captured by the CCD lens 32 to obtain a binary image, and obtaining sequential border points in the binary image. A detailed description of performing the binary image processing refers to paragraph is explained above. In one embodiment, the image processing module 212 only performs the binary image processing on the border of the captured image so as to decrease the number of calculations of the binary processing. A detailed description of obtaining sequential border points refers to paragraph is explained above.

In block S44, the image focusing module 211 determines if the sequential border points in the binary image are fuzzy, if the sequential border points are fuzzy, the process goes to block S45, otherwise, the process goes to block S46 if the sequential border points are clear. To determine if the sequential border points are fuzzy, the image focusing module 211 samples a preset quantity of border points from the sequential border points, calculates an average value of grads of the sampled border points, and determines the sequential border points are fuzzy if the average value of grads is less than a preset value.

In block S45, the image focusing module 211 performs an automatic focus function on the border of the object 35, then the process goes to block S43.

In block S46, the border measuring module 213 determines if the border of the object 35 has been completely captured, the process goes to block S49 if the border of the object 35 has been completely captured, otherwise, the process goes to block S47 if the border of the object 35 has not been completely captured. A detailed description of determining if the border of the object 35 has been completely is shown in FIG. 8 below.

In block S47, the border measuring module 213 calculates accurate border points according to the length of the measurement line and the sampling interval. A detailed description refers to paragraphs are explained above.

In block S48, the border measuring module 213 selects a last point from the accurate border points as a new start point to capture a next image of the object 35, determines a corresponding position of the CCD lens 32 according to the new start point, marks isS=false if an image of the object 35 is not the first captured image, and setting the new start point as the current point (Pc=the new start point), then the process goes to block S42. To determine the position of the CCD lens 32, a center point of a capture area of the CCD lens 32 being located on a tangent of the new start point, the new start point falling in a measurement area of the capture area. The measurement area is a sub-area of the capture area of the CCD lens 32. An example of determining a new start point and a corresponding position of the CCD lens 32 is shown in FIG. 6.

In block S49, the border measuring module 213 displays success information. For example, the success information is displayed on the display device 1 with a program dialog box.

Figure 7:
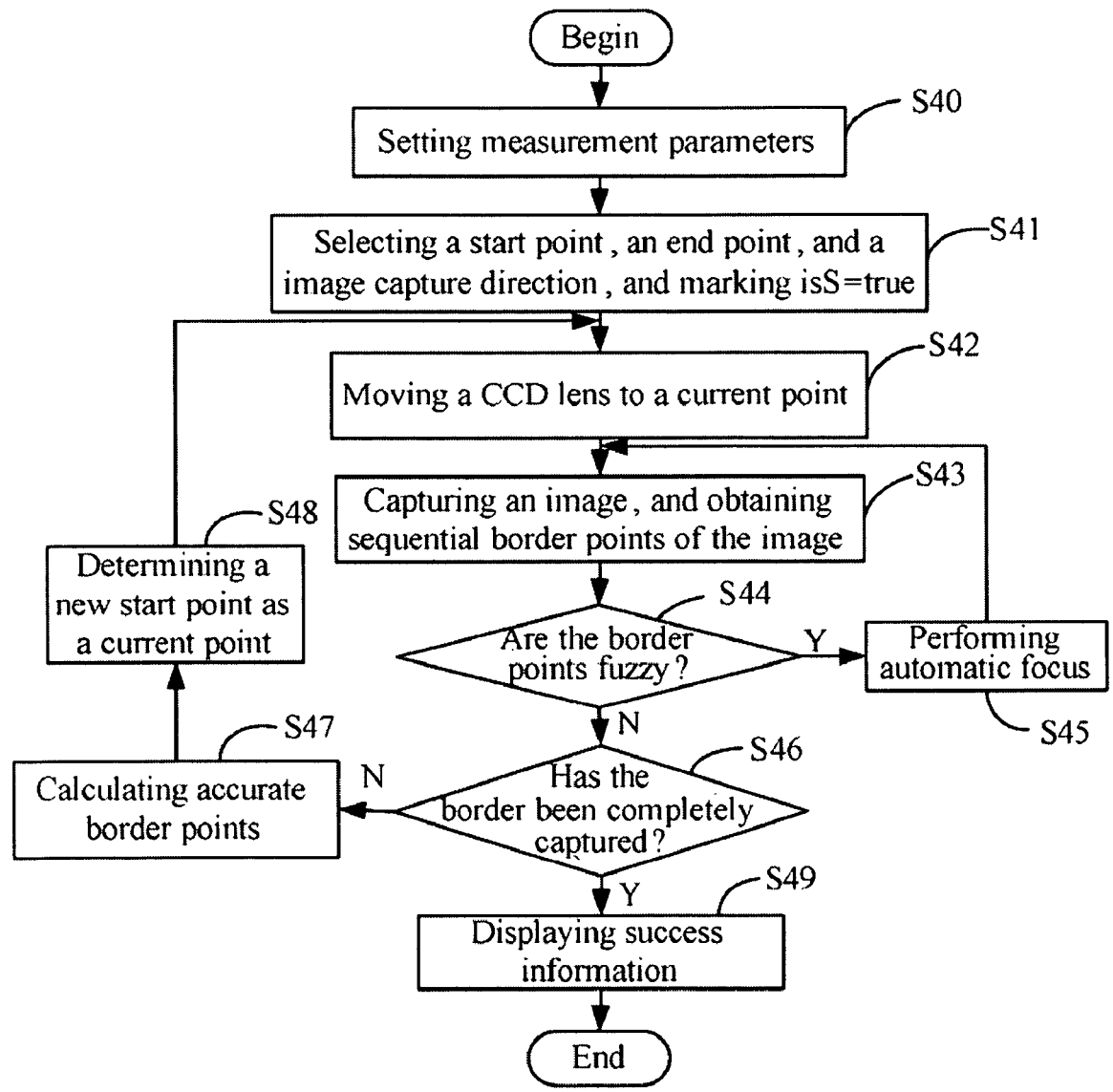
FIG. 7 is a flowchart of one embodiment of a method for measuring a border of an image of an object.

FIG. 8 is a detailed description of step S46 in FIG. 7. In block S461, the border measuring module 213 determines if the end point "Pe" is in the sequential border points, and goes to block S465 if the end point "Pe" is in the sequential border points, or goes to block S462 if the end point "Pe" is not in the sequential border points.

In block S462, the border measuring module 213 determines if isS=false and if the start point "Ps" is in the sequential border points, and goes to block S465 if isS=false and if the start point "Ps" is in the sequential border points, otherwise goes to block S463.

In block S463, the border measuring module 213 determines if isS=true and if the sequential border points form a loop, and goes to block S465 if isS=true and if the sequential border points form a loop, otherwise goes to block S464. A method for determining if the sequential border points form a loop is shown in Table. 1.

TABLE 1

| 1 | 2  | 3 |
|---|----|---|
| 8 | P1 | 4 |
| 7 | 6  | 5 |

In Table. 1, "P1" represents a first point of the sequential border points, if the last point of the sequential border points is located in any position of 1-8, the border measuring module 213 determines that the sequential border points form a loop.

In block S464, the border measuring module 213 captures a next image of the object 35.

In block S465, the border measuring module 213 determines the border of the object 35 has been completely captured.

The present embodiment provides a method for measuring a border of an image of an object. The present border measuring method automatically performs a focus function on the border of the image of the object only if the border is fuzzy, and performs binary image processing on the border of the image captured by the CCD lens 32 of the image measuring machine 3.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for measuring a border of an image of an object, the method comprising:
   (a) setting measurement parameters of the object, the measurement parameters comprising a length of a measurement line and a sampling interval of the object to determine accurate border points of the object;
   (b) selecting a start point, an end point, and an image capture direction of the object to capture an image of a border of the object, assigning a variable "isS" with a value of "true" if an image of the object is the first captured image, and setting the start point as a current point of the object;

(c) moving a charge coupled device (CCD) lens of an image measuring machine to the current point;

(d) capturing an image of the object, performing binary image processing on the border of the captured image to obtain a binary image, and obtaining sequential border points in the binary image;

(e) performing an automatic focus function on the border of the object if the sequential border points in the binary image are fuzzy, and repeating the step (d), or going directly to the step (f) if the sequential border points are clear, wherein the sequential border points in the binary image are determined to be fuzzy by:

sampling a preset quantity of border points from the sequential border points;

calculating an average value of grads of the sampled border points; and determining the sequential border points are fuzzy if the average value of grads is less than a preset value;

(f) determining if the border of the object has been completely captured according to the sequential border points in the binary image, and displaying success information if the border of the object has been completely captured, or executing step (g) if the border of the object has not been completely captured; and (g) calculating accurate border points according to the length of the measurement line and the sampling interval, selecting a last point from the accurate border points as a new start point to capture a next image of the object, determining a position of the CCD lens according to the new start point to capture the next image of the object, marking isS=false if an image of the object is not the first captured image, and setting the new start point as the current point, then returning to the step (c).

2. The method according to claim 1, wherein determining the sequential border points in the binary image are clear in step (e) if the average value of grads is greater than or equal to the preset value.

3. The method according to claim 1, wherein determining if the border of the object has been completely captured in step (f) comprises:

(e1) determining if the end point is in the sequential border points, and going to step (e5) if the end point is in the sequential border points, or going to step (e2) if the end point is not in the sequential border points;

(e2) determining if isS=false and the start point is in the sequential border points, and going to step (e5) upon the condition that isS=false and the start point is in the sequential border points, otherwise going to step (e3);

(e3) determining if isS=true and the sequential border points form a loop, and going to step (e5) if isS=true and the sequential border points form a loop, otherwise going to step (e4);

(e4) capturing a next image of the object; and (e5) determining the border of the object has been completely captured.

4. The method according to claim 1, wherein calculating accurate border points according to the length of the measurement line and the sampling interval in step (g) comprises:

sampling a quantity of border points from the sequential border points according to the sampling interval;

calculating a normal vector of each of the sampled border points, and obtaining a start point and an end point of the measurement line according to the normal vector and the length of the measurement line; and calculating a gradient chart from the start point to the end point of the measurement line, and obtaining a top point of each of the gradient charts to generate the accurate border points.

5. The method according to claim 1, wherein conditions of determining a position of the CCD lens according to the new start point to capture the next image of the object in step (g) comprises:

a center point of a capture area of the CCD lens is located on a tangent of the new start point; and the new start point falls in a measurement area of the capture area.

6. A non-transitory storage medium having stored thereon instructions that, when executed by a processor of a computer, causes the processor to perform a method for measuring a border of an image of an object, the method comprising:

(a) setting measurement parameters of the object, the measurement parameters comprising a length of a measurement line and a sampling interval of the object to determine accurate border points of the object;

(b) selecting a start point, an end point, and an image capture direction of the object to capture an image of a border of the object, assigning a variable "isS" with a value of "true" if an image of the object is the first captured image, and setting the start point as a current point of the object;

(c) moving a charge coupled device (CCD) lens of an image measuring machine to the current point;

(d) capturing an image of the object, performing binary image processing on the border of the captured image to obtain a binary image, and obtaining sequential border points in the binary image;

(e) performing an automatic focus function on the border of the object if the sequential border points in the binary image are fuzzy, and repeating the step (d), or going directly to the step (f) if the sequential border points are clear, wherein the sequential border points in the binary image are determined to be fuzzy by:

sampling a preset quantity of border points from the sequential border points;

calculating an average value of grads of the sampled border points; and determining the sequential border points are fuzzy if the average value of grads is less than a preset value;

(f) determining if the border of the object has been completely captured according to the sequential border points in the binary image, and displaying success information if the border of the object has been completely captured, or executing step (g) if the border of the object has not been completely captured; and (g) calculating accurate border points according to the length of the measurement line and the sampling interval, selecting a last point from the accurate border points as a new start point to capture a next image of the object, determining a position of the CCD lens according to the new start point to capture the next image of the object, marking isS=false if an image of the object is not the first captured image, and setting the new start point as the current point, then returning to the step (c).

7. The non-transitory storage medium according to claim 6, wherein determining the sequential border points in the binary image are clear in step (e) if the average value of grads is greater than or equal to the preset value.

8. The non-transitory storage medium according to claim 6, wherein calculating accurate border points according to the length of the measurement line and the sampling interval in step (g) comprises:

sampling a quantity of border points from the sequential border points according to the sampling interval;

calculating a normal vector of each of the sampled border points, and obtaining a start point and an end point of the measurement line according to the normal vector and the length of the measurement line; and calculating a gradient chart from the start point to the end point of the measurement line, and obtaining a top point of each of the gradient charts to generate the accurate border points.

9. The non-transitory storage medium according to claim 6, wherein conditions of determining a position of the CCD lens according to the new start point to capture the next image of the object in step (g) comprises:

a center point of a capture area of the CCD lens is located on a tangent of the new start point; and the new start point falls in a measurement area of the capture area.

10. The non-transitory storage medium according to claim 6, wherein the medium is selected from the group consisting of a hard disk drive, a compact disc, a digital video disc, and a tape drive.

* * * * *